(No Model.)
J. E. JUENEMANN.
BRACKET FOR CURTAIN ROLLERS.
No. 434,714. Patented Aug. 19, 1890.
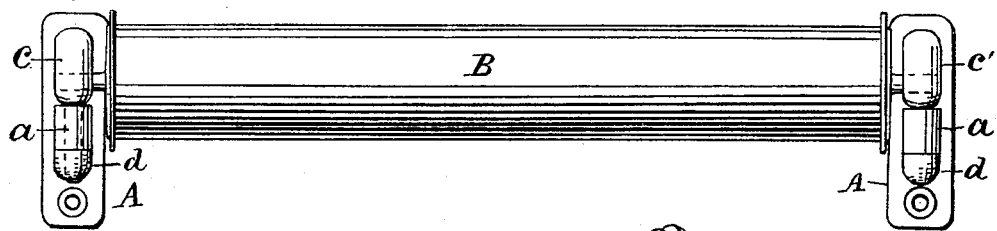
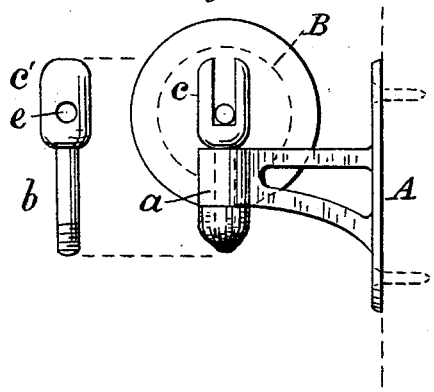
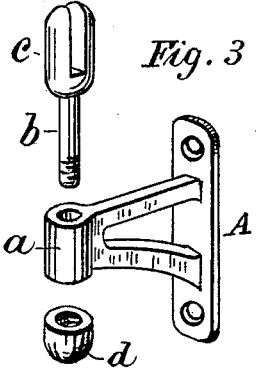
Witnesses:
Sam? C. Mills
Inventor:
Julius E. Juenemann

UNITED STATES PATENT OFFICE.

JULIUS E. JUENEMANN, OF WASHINGTON, DISTRICT OF COLUMBIA.

BRACKET FOR CURTAIN-ROLLERS.

SPECIFICATION forming part of Letters Patent No. 434,714, dated August 19, 1890.

Application filed January 3, 1890. Serial No. 335,823. (No model.)

*To all whom it may concern:*

Be it known that I, JULIUS E. JUENEMANN, a citizen of the United States, residing at Washington, in the District of Columbia, have invented certain new and useful Improvements in Brackets for Curtain-Rollers; and I do hereby declare the following to be a full, clear, and exact description of the invention, such as will enable others skilled in the art to which it appertains to make and use the same.

This invention relates to brackets for curtain-rollers; and it consists in an improved construction of brackets, as hereinafter described and claimed.

In the accompanying drawings, Figure 1 represents a front view of a curtain-roller and brackets provided with my improvement. Fig. 2 is a side view of a bracket with the roller in place. Fig. 3 shows the several parts of the device separated.

A designates the brackets, each of which is provided with a tubular socket $a$ in position to receive a small bolt or pin $b$, which carries a bearing-piece for a pintle or journal of the curtain-roller B. These bearings are formed in the heads $c$ $c'$ of the pins $b$, the head $c$ of one pin being bifurcated or formed with a slot or opening, in which the pintle on one end of the roller may readily be placed. The head $c'$ of the pin at the opposite end of the roller may be made with an aperture, as seen at $e$, to receive a pintle of the roller. The pins $b$ are threaded at their lower extremities and the securing-nuts $d$ are applied thereto. The said pins being placed in vertical position in the sockets $a$, the roller is placed with its pintles extending into the bearings carried by the pins and the nuts $d$ are screwed on the lower ends of the pins, as shown. As the bearing-pieces may be turned in their sockets, they may be readily adjusted to the line of the roller B in case of any inaccuracy in the setting of the brackets, and the said brackets may be set to extend from the casing at any angle and the bearings adjusted to register with the pintles. The form of bearing in the head $c$ may be used at both ends of the roller, if desired, and this form is adapted for use with any ordinary construction of roller with a pintle which is either round or square in section.

I claim—

The combination, with a curtain-roller, of a bracket consisting of a perforated plate having an arm extending therefrom and provided with a vertical tubular socket $a$ and pin $b$, which fits loosely in said socket, and is provided with a bifurcated head, which rests on said tubular socket and is adapted to receive and form a bearing for a pintle of the curtain-roller, whereby said bearing is adjustable to the line of the roller in case of inaccuracy of alignment or position of the bracket, substantially as and for the purposes set forth.

In testimony whereof I have affixed my signature in presence of two witnesses.

JULIUS E. JUENEMANN.

Witnesses:
SAML. C. MILLS,
O. WEHLMANN.